Feb. 19, 1952     J. S. PALMER     2,586,705
MEANS FOR DISTRIBUTING SOLIDS IN GASES IN CATALYTIC APPARATUS
Filed Feb. 14, 1948
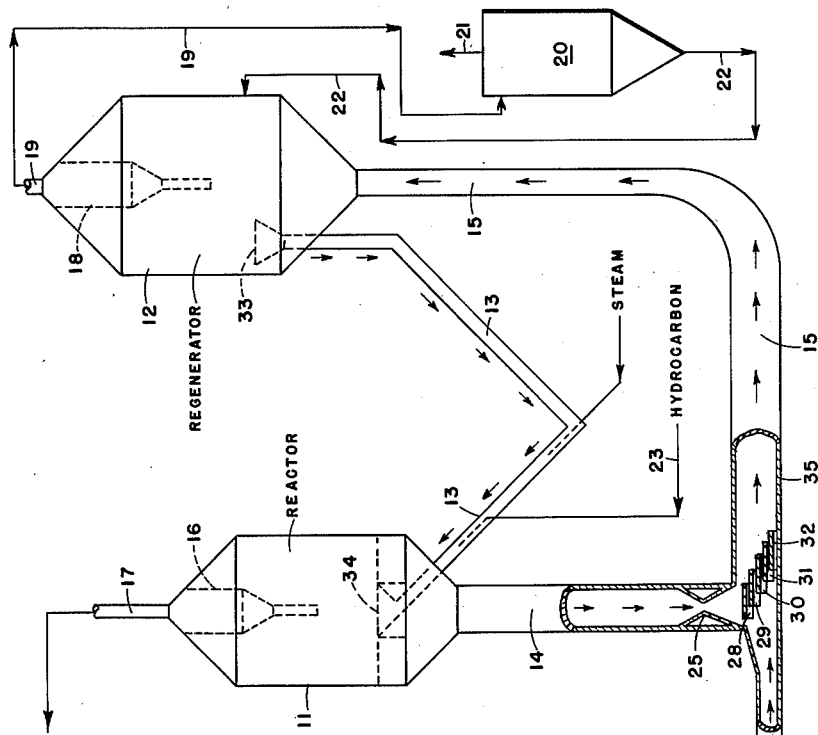
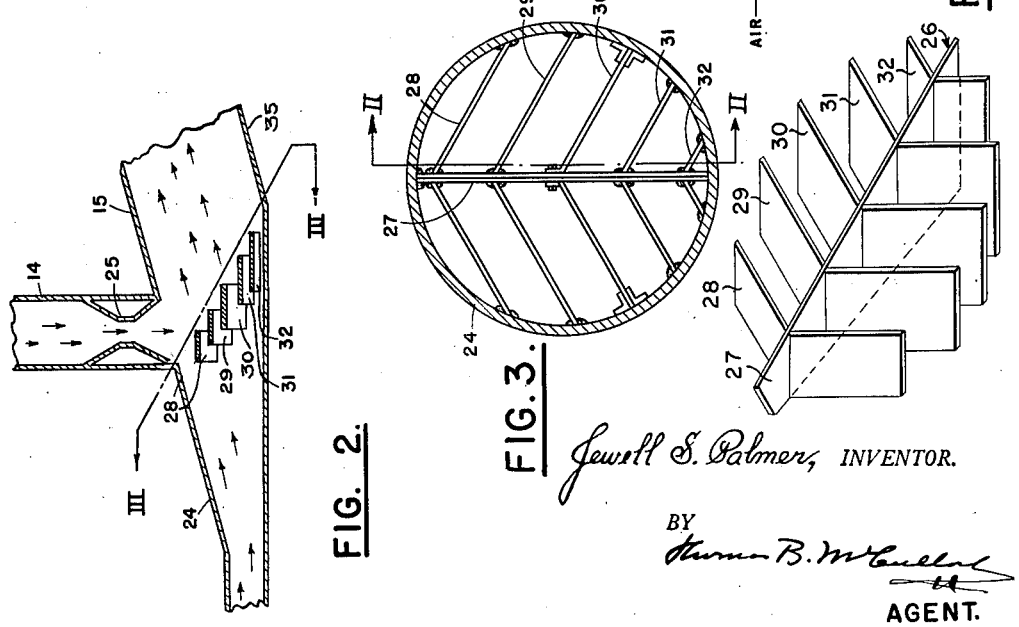
Jewell S. Palmer, INVENTOR.
BY
AGENT.

Patented Feb. 19, 1952

2,586,705

UNITED STATES PATENT OFFICE 2,586,705

MEANS FOR DISTRIBUTING SOLIDS IN GASES IN CATALYTIC APPARATUS

Jewell S. Palmer, Wooster, Tex., assignor, by mesne assignments, to Standard Oil Development Company, Elizabeth, N. J., a corporation of Delaware Application February 14, 1948, Serial No. 8,336

3 Claims. (Cl. 23—288)

The present invention is directed to a method and to apparatus for distributing solids in a gaseous stream. More particularly, the invention is directed to a method and apparatus for allowing distribution of catalyst in a stream of free oxygen-containing gas, or other gasiform material.

The invention also has to do with an apparatus and a method for distributing catalyst in a gaseous medium in a cracking operation in which a suspension of finely divided catalyst is formed in a hydrocarbon and the hydrocarbon cracked in said suspension. This type of catalytic cracking operation is known to the art as the fluid flow type.

There are two types of fluid catalytic cracking operations, the so-called "downflow" operation and the "upflow" method. In the downflow type of fluid flow catalytic cracking there is provided a reactor and a regenerator. Finely divided catalyst, in suspension in vapors of the hydrocarbons to be cracked, is fed into the bottom of the reactor. The velocity of flow of the hydrocarbons is regulated so that hydrocarbon vapors carry the catalyst to an intermediate point in the reactor at which point there is a concentration of catalyst resulting in the forming of a dense zone from the outer annulus of which the catalyst particles drop to the bottom of the reactor from which they are withdrawn. Upon leaving the reactor the catalyst particles are picked up by a stream of hot air which carries them to the regenerator where the carbonaceous materials deposited on the catalyst in the reactor are consumed by combustion. The catalyst flow in the regenerator follows the same pattern as to the reactor with regenerated catalyst falling into a well in the lower section of the regenerator from which point it is fed back to the reactor. A detailed description of the downflow type of fluid flow catalytic cracking process is given in U. S. Patent 2,407,374 to Conrad H. Kollenberg.

In the upflow type of fluid flow catalytic cracking, a reactor and a regenerator are also employed. Finally divided catalyst, in suspension in vapors of the hydrocarbons to be cracked, is fed into the bottom of the reactor. The catalyst and the hydrocarbon vapors leave the reactor in a common stream and are separated in equipment provided for this purpose. The catalyst is then fed into the regenerator where the carbonaceous materials deposited on the catalyst in the reactor are burned off in the presence of controlled amounts of air. The catalyst from the regenerator is separated from the gaseous products of combustion and is then fed back to the reactor.

It is well known to employ either of these two types of fluid flow cracking to convert relatively high molecular weight hydrocarbons, such as heavy naphtha or gas oil and the like, to relatively low molecular weight hydrocarbons, such as light naphtha, in the presence of powdered catalyst comprising oxides of silicon and aluminum, silicon and zirconium, or silicon and titanium, certain specially activated natural clays, and the like at temperatures in the range of about 850° to 1100° F. In these catalytic cracking operations in which hydrocarbons are cracked by the so-called fluid flow technique, solid catalyst particles having diameters in the range from about 0 to 100 mu with a predominating part in the range between 20 and 100 mu are suspended in the hydrocarbon to be cracked, passed to a reaction zone, and the reaction product separated from the catalyst. It is necessary to handle immense quantities of catalyst in view of the nature of the process. For example, in a reaction zone of a typical catalytic cracking operation of the fluid flow type, anywhere from about 20 to about 55 tons of catalyst per minute may be withdrawn from a reaction zone of a unit charging as much as 25,000 to 35,000 barrels of feed stock per day. This amount of catalyst discharges from the reactor of a downflow unit into a line connecting the reactor and the regenerator including a regeneration zone in which combustion conditions are maintained to burn off carbonaceous material deposited on the catalyst. The vast amount of catalyst passing from the reactor into the lines connecting the reaction zone to the regenerator zone frequently results in the buildup of catalyst in these lines. It might be mentioned that the enormous quantities of catalyst coupled with the tremendous flow of vaporized hydrocarbon or other gaseous material requires pipes or conduits having diameters of anywhere from 6 to 9 feet. Thus, the immense amounts of catalyst dropping into these large lines frequently build up in the lines and cause pressure drop which results in a lowering of the capacity of the whole unit. Under best operating conditions, of course, the catalyst dropping from a vertical conduit into a more or less horizontal conduit transverse the vertical conduit, is picked up by a blast of air or other gaseous material to be transported to the regeneration zone where combustion conditions are maintained. However, this is not always the case, and as mentioned before, the catalyst may accumulate at a point adjacent the outlet from the reactor where it connects into the conduit carrying the catalyst into the regenerator.

It is, therefore, the main object of the present invention to provide a method for dispersing finely divided catalyst particles to form a suspension of catalyst in a gaseous fluid.

Another object of the present invention is to provide an apparatus structure for maintaining a suspension of catalyst particles in a gaseous fluid.

A still further object of the present invention is to provide a baffle structure in a conduit to cause distribution of catalyst particles as they drop down across the baffle into a flow of a gaseous fluid.

The objects of the present invention are achieved by locating in a transverse conduit adjacent a vertical conduit connecting into the transverse conduit, a vertical partition or center member across which baffle plates depend at an angle greater than 90° and which are attached both to the center member and to the walls of the conduit in which the structure is located.

Therefore, in accordance with the present invention, buildup of catalyst in the large lines employed in catalytic cracking of the fluid flow type is substantially reduced by providing a structure including apparatus elements which allow distribution of the catalyst in these large lines so that it may be easily picked up and carried by the gas, which may be oxygen-containing gas or air, which is used to transport it, and which utlimately serves as a source oxygen in the regeneration operation.

The apparatus including the preferred structure of the present invention includes a device which may be positioned in a conduit transverse a vertical conduit from a reaction chamber of a fluid flow catalytic cracking operation to provide a baffle arrangement for dispersion of catalyst in a stream of air and catalyst flowing through the transverse conduit. Preferably, a center structure partition member is provided in a conduit adjacent and below the vertical conduit attached to the transverse conduit with dependent baffle plates suitably arranged to cause deflection of the catalyst downwardly across the stream of air flowing through the conduit. The baffle members are of suitable sizes and structure and are rigidly connected to the walls of the transverse conduit. The baffles are arranged to provide a cascade effect of downflowing catalyst through the vertical conduit from the reaction zone into the transverse conduit and should be arranged to form angles with the center partition member greater than 90°.

In a typical arrangement of apparatus in accordance with the present invention, in a conduit of 8 feet in diameter a partition is centered in the transverse conduit from its dependent baffle structure members to provide a cascade across the conduit. A typical arrangement will include at least 5 baffles on each side of a center partition member arranged at an angle greater than a right angle but less than 180. The angle at which the baffles are arranged, of course, will depend upon the nature of the solids being handled.

The present invention may be more clearly understood from the following detailed description of the accompanying drawing in which Fig. 1 is a diagrammatic flow sheet of a downflow catalytic cracking system employing the feature of the present invention and showing its relation to the reaction chamber and the regeneration chamber;

Fig. 2 shows an arrangement of the apparatus arranged in a transverse conduit below a vertical conduit;

Fig. 3 shows a section of the conduit including the apparatus of the present invention taken along the line III—III of Fig. 2; and Fig. 4 is a view of the apparatus of the present invention shown in perspective and withdrawn from and independent of the conduit.

Referring now to the drawing and especially to Fig. 1, numeral 11 designates a reaction chamber and numeral 12 designates a regeneration chamber. Regenerator 12 is fluidly connected to reactor 11 by conduit 13 and reactor 11 is fluidly connected to regenerator 12 by vertical conduit 14 and transverse conduit 15. Reactor 11 is provided with a separator 16 which may be one of the cyclone type although other separating means may be provided. Reactor 11 is also provided with an outlet line 17 by way of which product is removed therefrom. Regenerator 12 is also provided with a separator 18 which may be a cyclone separator similar to separator 16 in reactor 11. Regenerator 12 is also provided with a line 19 which discharges into a Cottrell precipitator 20 by way of which separation may be made between any fine catalyst particles leaving regenerator 12 by line 19. Cottrell precipitator 20 is provided with a line or stack 21 through which combustion gases may be discharged therefrom and with a line 22 to discharge separated catalyst particles back into the regenerator 12.

Hydrocarbon feed stock is introduced into line 13 by line 23 and air for circulation of catalyst from reactor 11 to regenerator 12, and for regeneration of the catalyst in regenerator 12 may be introduced by line 24.

Located in conduit 15 at a point immediately below cone member 25 is a baffle structure 26 which is laid transverse the conduit 15. This baffle structure 26 comprises a center partition member 27 indicated by the dotted line and baffle plates 28, 29, 30, 31, and 32.

In accordance with the description taken in conjunction with Fig. 1 of the drawing, a hydrocarbon feed such as a gas oil hydrocarbon is introduced into the system by way of line 23 where it is met by a flow of hot catalyst particles withdrawn from regenerator 12 by funnel shaped member 33 in line 13. The suspension of catalyst particles in hydrocarbon feeds into the reactor 11 through funnel shaped member 34 wherein a dense phase of catalyst and hydrocarbons is maintained; reaction conditions are adjusted for catalytic cracking of the hydrocarbons. As mentioned before, a temperature in the range between 850° and 1100° F. will be maintained in reaction zone 11. Ordinarily the temperature will be in the range from about 940° to about 975° F.

In reactor 11, the catalytic cracking operation takes place with the products and suspended catalyst flowing upwardly into cyclone separator 16 wherein a separation is made between the hydrocarbons and the catalyst with the catalyst dropping back into the reactor 11 and the product withdrawn to a fractionation zone, not shown, by line 17. The catalyst drops back to the outer annulus of reactor 11 and thence downward into the reactor where it may be stripped by injection of a hydrocarbon or steam, by means not shown, to remove strippable hydrocarbons from the catalyst. After the stripping operation, catalyst flows downwardly into conduit 14 and thence into conduit 15, passing through cone shaped member 25 which restricts the flow and thereby increases the velocity of the flow of catalyst prior to its entering the conduit 15. Prior to the present invention, pressure drop across the conduit 15 was being experienced by buildup of catalyst immediately before and after the point indicated by the numeral 35. For some unknown reason the catalyst dropping down into the conduit 15 was not being adequately fluidized by the air being introduced by line 24. The baffle members 28, 29, 30, 31 and 32 allow distribution of the catalyst across the flow of air and gives the air time to pick up the catalyst and adequately fluidize and carry it through the conduit 15 and thence to the regenerator 12 where the regeneration reaction takes place by maintenance of combustion conditions therein.

Referring now to Fig. 2, identical numerals will be employed to identify similar parts with respect to Fig. 1. Numeral 14 designates a conduit through which catalyst flows from a reaction zone to a conduit 15 and particularly through a cone shaped member 25 into the conduit 15. The conduit is connected to a third conduit 24 through which air is introduced to transport the catalyst falling into the conduit 15. The air flows in a direction indicated by the arrows and is introduced across the downflowing catalyst by conduit 24. Immediately ahead of and across the point of ingress and below conduit 14 is arranged a center member 27 provided with baffles 28, 29, 30, 31 and 32.

As will be seen, the baffles 28, 29, 30, 31, and 32 are arranged at an angle with the center member 27 as shown in Fig. 3 to allow a cascade effect of the catalyst flowing down and across the baffle arrangement. This prevents buildup of catalyst in the portion of conduit 15 indicated by numeral 35. The improved apparatus of the present invention should be located immediately below and extending past the entrance of conduit 14 into the conduit 15.

An apparatus structure in accordance with the description taken with the drawing was installed in a fluid catalytic cracking unit of the down flow type in the conduit transporting catalyst from the reactor to the regenerator. The catalytic cracking unit was charging hydrocarbon at a feed rate of 25,000 to 30,000 barrels per day. The catalyst circulating in the system had particle diameters in the range from about 0 to 100 mu with the predominating quantity of the catalyst having particle diameters in the range between 20 and 80 mu. Catalyst was circulated through the system at a rate of about 44,000 tons per day. Prior to the installation of the apparatus of the present invention, the pressure drop across the conduit 15 was about 3 pounds per square inch gauge. After the improved apparatus had been installed in the conduit, the pressure drop was lowered to about 0.3 pound per square inch gauge. It will thus be seen that installing the improved apparatus in conduit 15 at a point immediately below cone member 25 where the catalyst flows from conduit 14 to conduit 15 allows a substantial decrease in the pressure drop and resulted in improved circulation of catalyst in the system, and, thus in effect, substantially improved the operation in view of the enhanced fluidization of the catalyst in the conduit 15.

While the invention has been described and illustrated by reference to the fluid catalytic cracking of hydrocarbons, it is to be emphasized that the invention is not restricted to this particular type of operation but may be employed in any operation in which finely divided particles drop into a flowing stream from a vertical conduit into a transverse conduit. For example, the fluidized technique is employed in the synthesis of hydrocarbons from carbon monoxide and hydrogen and it is contemplated that the invention will have application to such operations. The fluidization of finely divided particles also has application in chemical manufacture and the present invention may allow improved operations in such reactions by improving the contact of the catalyst with a gaseous medium.

The nature and objects of the present invention having been completely described and illustrated, what I wish to claim as new and useful and to secure by Letters Patent is:

1. In a catalytic cracking apparatus including a reaction chamber and a regeneration chamber and a conduit connecting said reaction chamber to said regeneration chamber, a vertical conduit from said reaction chamber, a second conduit attached to the lower end of said vertical conduit transverse the vertical conduit and defining a passage from said reaction chamber to said regeneration chamber, a partition member in said second conduit located at a point below the point of attachment of said vertical conduit to said second condit, and parallel baffle plates depending from and attached rigidly to said partition member and to the inner walls of said second conduit, said baffle members being arranged in step-like fashion with the downstream end of each baffle member projecting into said second conduit further than the corresponding end of the baffle member above it and each baffle member forming an angle less than 180° but greater than 90° with said partition member.

2. In an apparatus for flowing a finely divided solid as a suspension in a gaseous medium, a vertical conduit, a second conduit attached to the lower end of said vertical conduit and transverse the vertical conduit, a partition member in said second conduit located at a point below the point of attachment of said vertical conduit and said second conduit, and parallel baffle plates depending from and attached rigidly to said partition member and the inner walls of said second conduit, said baffle members being arranged in step-like fashion with the downstream end of each baffle member projecting into said second conduit further than the corresponding end of the baffle member above it and each baffle member forming an angle less than 180° but greater than 90° with said partition member.

3. In an apparatus for flowing a finely divided solid as a suspension in a gaseous medium, a vertical conduit, a second conduit attached to the lower end of said vertical conduit and transverse the vertical conduit, a cone shaped member in said vertical conduit adjacent the second conduit attached to said vertical conduit transverse the vertical conduit and defining a passage from said vertical to said second conduit, a partition member in said second conduit located at a point below the point of attachment of said vertical conduit to said second conduit and immediately below said cone shaped member, and parallel baffle plates depending from and attached rigidly to said partition member and to the inner walls of said second conduit, said baffle members being arranged in step-like fashion with the downstream end of each baffle member projecting into said second conduit further than the corresponding end of the baffle member above it and each baffle member forming an angle less than 180° but greater than 90° with said partition member.

JEWELL S. PALMER.

REFERENCES CITED

The following references are of record in the file of this patent:

UNITED STATES PATENTS

| Number | Name | Date |
|---|---|---|
| 1,697,049 | Cox | Jan. 1, 1929 |
| 2,380,324 | Munday | July 10, 1945 |
| 2,407,374 | Kollenberg | Sept. 10, 1946 |
| 2,416,608 | Brachenbury | Feb. 25, 1947 |
| 2,421,212 | Medlin | May 27, 1947 |

FOREIGN PATENTS

| Number | Country | Date |
|---|---|---|
| 141,903 | Great Britain | Apr. 29, 1920 |